United States Patent
Benhase et al.

(10) Patent No.: US 10,042,779 B2
(45) Date of Patent: *Aug. 7, 2018

(54) SELECTIVE SPACE RECLAMATION OF DATA STORAGE MEMORY EMPLOYING HEAT AND RELOCATION METRICS

(71) Applicant: International Business Machines Corporation, Armonk, NY (US)

(72) Inventors: Michael T. Benhase, Tucson, AZ (US); Evangelos S. Eleftheriou, Rueschlikon (CH); Lokesh M. Gupta, Tucson, AZ (US); Robert Haas, Adliswil (CH); Xiao Y. Hu, Horgen (CH); Matthew J. Kalos, Tucson, AZ (US); Ioannis Koltsidas, Zurich (CH); Roman A. Pletka, Uster (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/692,302

(22) Filed: Aug. 31, 2017

(65) Prior Publication Data

US 2017/0364448 A1 Dec. 21, 2017

Related U.S. Application Data

(63) Continuation of application No. 15/175,109, filed on Jun. 7, 2016, now Pat. No. 9,830,277, which is a (Continued)

(51) Int. Cl.
*G06F 3/06* (2006.01)
*G06F 12/122* (2016.01)
(Continued)

(52) U.S. Cl.
CPC .......... *G06F 12/122* (2013.01); *G06F 3/0608* (2013.01); *G06F 3/0652* (2013.01);
(Continued)

(58) Field of Classification Search
CPC ............. G06F 12/0811; G06F 12/0871; G06F 12/0888; G06F 12/0897; G06F 12/126; G06F 12/127
(Continued)

(56) References Cited

U.S. PATENT DOCUMENTS 5,974,508 A 10/1999 Maheshwari
6,425,057 B1 7/2002 Cherkasova et al.
(Continued)

FOREIGN PATENT DOCUMENTS

| CN | 101339808 A | 1/2009 |
| WO | 2011061724 A1 | 5/2011 |
| WO | 2013064936 A1 | 5/2013 |

OTHER PUBLICATIONS

International Search Report and the Written Opinion of the International Searching Authority, International Application No. PCT/IB2012/055801, dated Mar. 14, 2013, 11 pages.
(Continued)

*Primary Examiner* — Nathan Sadler
(74) *Attorney, Agent, or Firm* — Nicholas D. Bowman (57) ABSTRACT

Space of a data storage memory of a data storage memory system is reclaimed by determining heat metrics of data stored in the data storage memory; determining relocation metrics related to relocation of the data within the data storage memory; determining utility metrics of the data relating the heat metrics to the relocation metrics for the data; and making the data whose utility metric fails a utility metric threshold, available for space reclamation.

17 Claims, 3 Drawing Sheets

Related U.S. Application Data continuation of application No. 14/857,134, filed on Sep. 17, 2015, now Pat. No. 9,442,660, which is a continuation of application No. 13/285,890, filed on Oct. 31, 2011, now Pat. No. 9,158,706.

(51) Int. Cl.
*G06F 12/128* (2016.01)
*G06F 12/126* (2016.01)
*G06F 12/02* (2006.01)
*G06F 12/0871* (2016.01)
*G06F 12/121* (2016.01)

(52) U.S. Cl.
CPC ........ *G06F 3/0683* (2013.01); *G06F 12/0253* (2013.01); *G06F 12/121* (2013.01); *G06F 12/126* (2013.01); *G06F 12/128* (2013.01); *G06F 12/0871* (2013.01); *G06F 2212/222* (2013.01); *G06F 2212/7205* (2013.01)

(58) Field of Classification Search
USPC .................................. 711/122, 133–136, 138
See application file for complete search history.

(56) References Cited

U.S. PATENT DOCUMENTS

| | | | |
|---|---|---|---|
| 6,449,695 | B1 | 9/2002 | Bereznyi et al. |
| 6,507,893 | B2 | 1/2003 | Dawkins et al. |
| 6,622,199 | B1 | 9/2003 | Spall et al. |
| 6,826,599 | B1 | 11/2004 | Shaffer et al. |
| 8,099,554 | B1 | 1/2012 | Solomon et al. |
| 8,255,624 | B2 | 8/2012 | Fujii et al. |
| 9,158,706 | B2 | 10/2015 | Benhase et al. |
| 9,442,660 | B2 | 9/2016 | Benhase et al. |
| 9,830,277 | B2 * | 11/2017 | Benhase ............... G06F 12/122 |
| 2005/0015562 | A1 | 1/2005 | Goodsell |
| 2008/0059707 | A1 | 3/2008 | Makineni et al. |
| 2008/0114930 | A1 | 5/2008 | Sanvido et al. |
| 2008/0209131 | A1 | 8/2008 | Komegay et al. |
| 2008/0235457 | A1 | 9/2008 | Hasenplaugh et al. |
| 2008/0307192 | A1 | 12/2008 | Sinclair et al. |
| 2010/0030970 | A1 | 2/2010 | Qureshi |
| 2011/0238908 | A1 | 9/2011 | Kurita |
| 2012/0124291 | A1 | 5/2012 | Achilles et al. |
| 2013/0111131 | A1 | 5/2013 | Benhase et al. |
| 2013/0111133 | A1 | 5/2013 | Benhase et al. |
| 2013/0111146 | A1 | 5/2013 | Ash et al. |
| 2015/0039836 | A1 | 2/2015 | Wang et al. |
| 2016/0292083 | A1 | 10/2016 | Benhase et al. |

OTHER PUBLICATIONS

Li, B., "Research on the Write Efficiency and Energy Optimization of Solid State Drives", Electronic Issue of Chinese Doctoral Dissertations Full-text Databases, English Abstract, Jul. 15, 2011, 3 pages.

Wang et al., "Storage zoning algorithm based on page migration for database with hybrid architecture", Journal of Computer Applications, English Abstract, Nov. 30, 2010, vol. 30, No. 11, pp. 2962-2964.

Examination Report under Section 18(3) for Application No. GB1409102.9, dated Jun. 23, 2014, 2 pages.

Response to Examination Report for Application No. GB1409102.9, dated Aug. 22, 2014, 44 pages.

Qi De-Yu et al., "A Static Wear-leveling Algorithm Based on NAND Flash", Journal of Chongqing Institute of Technology (Natural Science), vol. 23 No. 7, Jul. 2009, English Abstract Only, 1 page.

Jalminger et al., "A cache block reuse prediction scheme" pp. 373-385, Microprocessors and Microsystems, Elsevier, May 2004. vol. 28.

Qureshi et al., "A Case for MLP-Aware Cache Replacement" pp. 45-52, IEEE, Jun. 2006. ISCA '06.

Gao et al., "A Dueling Segmented LRU Replacement Algorithm with Adaptive Bypassing" http://hal.archives-puvertes.fr/docs/00/49/29/65/PDF/005_gao.pdf, Jun. 2010.

Kang et al., "A Superblock-based Flash Translation Layer for NAND Flash Memory" pp. 161-170, ACM. EMSOFT Oct. 6, 2006.

Qureshi et al., "Adaptive Insertion Policies for High Performance Caching" pp. 381-391, ACM. ISCA '07. Jun. 2007.

Dybdahl et al., "An LRU-based Replacement Algorithm Augmented with Frequency of Access in Shared Chip-Multiprocessor Caches" pp. 45-52, ACM. MEDEA '06 ACM SIGARCH Computer Architecture News. vol. 35, Sep. 2006.

Gaur et al., "Bypass and Insertion Algorithms for Exclusive Last-level Caches" pp. 81-92, ACM. ISCA '11., Jun. 2011.

Xiang et al., "Less Reused Filter: Improving L2 Cache Performatnce via Filtering Less Reused Lines" pp. 68-79, ACM. ICS '09, Jun. 2009.

Yamanouchi, "Page Allocation Control" pp. 334-337, IBM Technical Disclosure Bulletin vol. 32, Jan. 1990.

Johnson et al., "Run-time Adaptive Cache Hierarchy Management via Reference Analysis" pp. 315-326, ACM. ISCA '97, Jun. 1997.

Duong et al, "Score: A Score-Based Memory Cache Replacement Policy" http://www.jilp.org/jwac-1/online/papers/004_duong.pdf, Jun. 2010.

* cited by examiner

SELECTIVE SPACE RECLAMATION OF DATA STORAGE MEMORY EMPLOYING HEAT AND RELOCATION METRICS

CROSS-REFERENCE TO RELATED APPLICATIONS

This Application is a Continuation of U.S. patent application Ser. No. 15/175,109, filed on Jun. 7, 2016, now U.S. Pat. No. 9,830,277, which is a continuation of application Ser. No. 14/857,134, filed on Sep. 17, 2015, now U.S. Pat. No. 9,442,660, which is a continuation of application Ser. No. 13/285,890, filed on Oct. 31, 2011, now U.S. Pat. No. 9,158,706.

FIELD OF THE INVENTION

This invention relates to computer-implemented data storage memories, and more particularly to memory space reclamation.

BACKGROUND OF THE INVENTION

Computer-implemented data storage systems typically comprise various types of data storage in which data is stored on behalf of host computer systems. Storage controls control access to data storage media and memories in response to read and write requests. The storage controls may direct the data in accordance with data storage memories and devices such as cache, non-volatile storage, RAID (redundant array of independent disks), JBOD (just a bunch of disks), etc. arranged into various redundancy, access speed and security levels.

As an example, an International Business Machines Corp. (IBM®) ESS (Enterprise Storage Server) such as a DS8000™ has redundant clusters of computer entities, cache memories, non-volatile storage, etc., called "central electronics complexes" or "CECs".

Within a data storage system, fast memories may be employed as cache used to store data or instructions that were accessed recently, are accessed frequently, or are likely to be accessed in the near future. Data stored in cache memories can be accessed quickly instead of being fetched or recomputed, saving both time and resources.

Cache memories can be provided in multiple levels. For example, a cache data storage system may comprise both a "first" or "primary" cache memory and a "secondary" cache memory. Typically, the first cache memory has faster access and is more costly per unit of data than a secondary cache memory, and the secondary cache memory has greater storage capacity than the first cache memory. For example, a first cache memory comprises DRAM ("dynamic random access memory"), while the secondary cache comprises flash memory solid-state drives (SSDs) such as "Flash_Cache" (TM International Business Corp.). When accessing data, a computing system or device may first look for data in the first cache memory and, if the data is not present there, look for the data in the secondary cache memory. When data is not available in either memory, it typically is accessed from the major data storage which comprises slower access speed data storage such as RAID, JBOD, etc. When data is read, it typically remains in the major data storage and is copied to the first cache memory and/or the secondary cache memory. If read data in the first cache memory is not accessed promptly or frequently, it may be demoted to the secondary cache memory or evicted. If read data in the secondary cache memory is not accessed promptly or frequently, it may be evicted. When writing data, a computing system or device may write data to the first cache memory. If write data in the first cache is not accessed promptly or frequently, this data may be demoted to the secondary cache memory. If data is not accessed promptly or frequently from the secondary cache memory, it may be demoted to the slower access speed data storage such as RAID, JBOD, etc. Alternatively, write data may be written to the major data storage as soon as possible after being received by the data storage system.

Typically, a LRU (least recently used) algorithm is employed to demote data to the next lower level or to evict data from the first cache memory or the secondary cache memory.

In some memories, such as a secondary cache memory, the data is stored in log-structured fashion (written sequentially, requiring a log to determine where data is stored on a logical basis) as pages in large extents of data. The data pages are reviewed under a LRU algorithm, and the least recently used pages are invalidated. To reclaim space, the system will select the log-structured extents (LSEs) that have the most invalidated pages and compact the valid pages, relocating them in new LSEs, leaving one or more LSEs free. The relocations incur a large number of I/O (input/output) relocation operations, as many LSEs need to be read and one or more LSEs written at each iteration of the reclamation process.

SUMMARY OF THE INVENTION

Methods, computer-implemented data storage memory systems, and computer program products are provided for reclaiming space of a data storage memory of a data storage memory system. "Memory" in this context is any type of memory having to invalidate, evict or demote data to make space available for new incoming data, an example of which is a cache memory.

In one embodiment of a computer-implemented data storage memory system, the following is performed:
determining heat metrics of data stored in the data storage memory;
determining relocation metrics related to relocation of the data within the data storage memory;
determining utility metrics of the data relating the heat metrics to the relocation metrics for the data; and
making the data whose utility metric fails a utility metric threshold, available for space reclamation.

Thus, data that otherwise may be saved, but that fails the utility metric threshold, is instead invalidated, and does not have to be relocated in the data storage memory.

In a further embodiment, data whose utility metric meets or exceeds the utility metric threshold is exempted from space reclamation eligibility.

In a further embodiment, data recently added to the data storage memory is exempted from space reclamation eligibility.

In a still further embodiment, data designated as ineligible by space management policy is exempted from space reclamation eligibility.

In another embodiment, the utility metric threshold is determined from an average of utility metrics for data of the data storage memory.

In a further embodiment, the average of utility metrics for data of the data storage memory is determined over a period of time or a predetermined number of requests processed.

In still another embodiment, the utility metric threshold is dynamically determined from an average of utility metrics for data of the data storage identified in an LRU list for the data storage memory.

In yet another embodiment, the data stored in the data storage memory is in the form of pages, and the utility metric threshold for a tentative space reclamation victim page of the data, is dynamically determined from an average of utility metrics for pages of the data having similar heat metrics to the tentative space reclamation victim.

In another embodiment, the data stored in the data storage memory is in the form of pages in log structured extents; and the method additionally comprises:

invalidating pages of the data eligible for reclamation;

selecting at least one log structured extent having the greatest number of invalidated pages, for relocating valid pages therein into another log structured extent, to reclaim the selected log structured extent.

In a further embodiment, the heat metric is based upon the number of hits to data whose heat metric is being determined; and the relocation metric is based upon the number of times the data whose relocation metric is being determined is relocated to another log structured extent.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
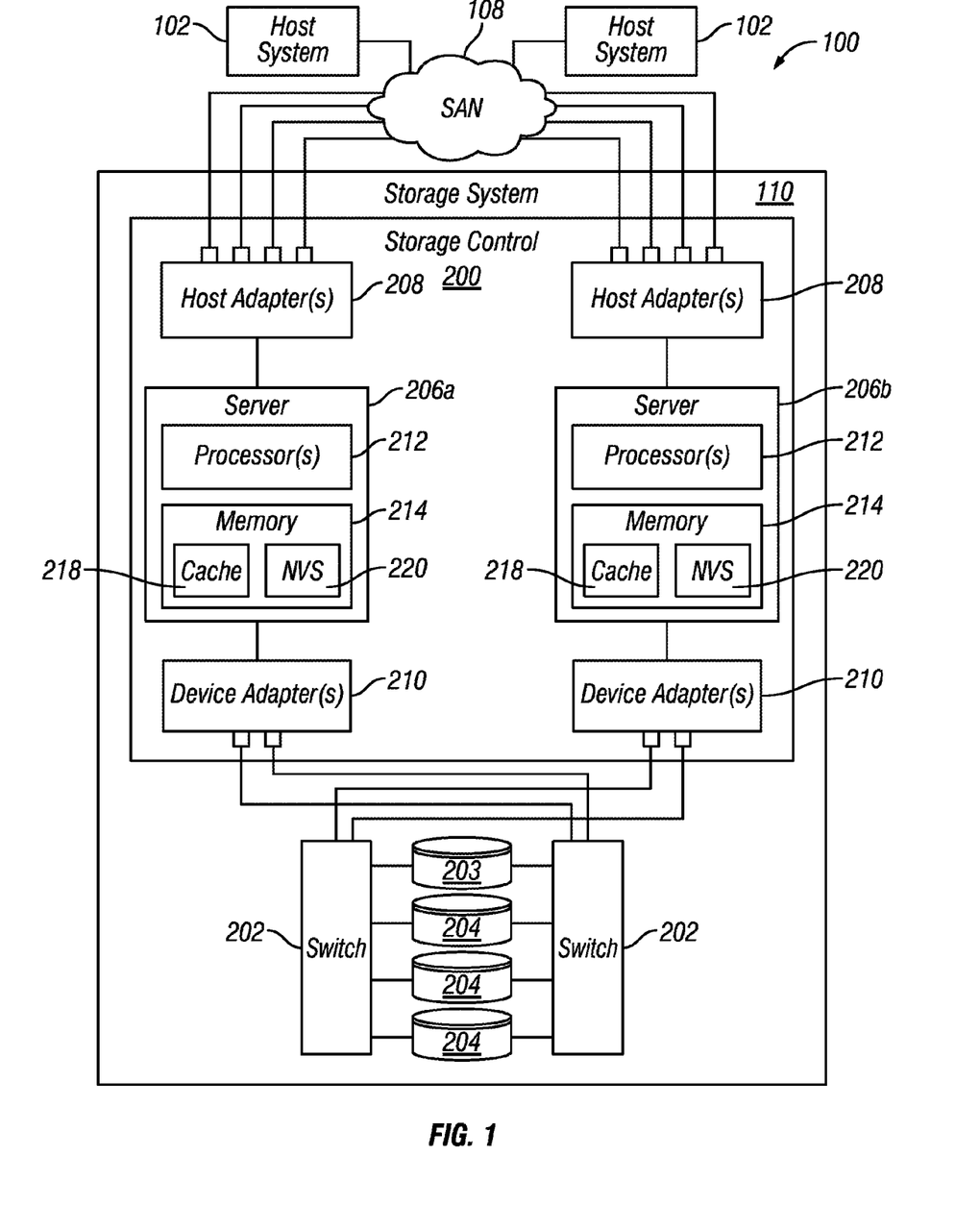
FIG. 1 is a block diagram of an exemplary network and computer-implemented storage server system in which the present invention may be implemented.

Referring to FIG. 1, an example of computer-based network architecture 100 is illustrated with a computer-implemented data storage system 110 which may implement a computer-implemented cache data storage system and methods discussed herein. The architecture 100 is presented only by way of example and is not intended to be limiting. The computer-implemented cache data storage system and methods disclosed herein may be applicable to a wide variety of different computers, servers, data storage systems, and network architectures.

The exemplary network architecture 100 may comprise one or more host computer systems 102 coupled to a network, such as a storage area network (SAN) 108. The network 108 may comprise any suitable private or public interconnection using any suitable protocol. The storage system 110 comprises a storage control 200 configured to transfer data to and from and to control the operation of switches 202 and data storage 203 and 204. The data storage may comprise, for example, arrays of solid-state drives and hard disk drives accessible via switches 202. Alternatively or additionally, the data storage 203 and 204 may comprise individual devices or may comprise data storage libraries with many devices. All or any of the host systems 102 may direct and utilize the storage system 110 and utilize the storage control 200 and data caching system herein.

The caching system may be implemented within a storage control 200 and may also be applicable to other storage systems. As shown, the storage control 200 comprises one or more servers 206. The control 200 may also comprise host adapters 208 and device adapters 210 to provide the interfaces to connect the control 200 to host systems 102 and data storage 203 and 204, respectively. Multiple servers 206a, 206b may provide redundancy to ensure that data is always available to connected hosts 102. Thus, should one server 206a fail, the other server 206b may remain functional to ensure that data transfer is able to continue between the host systems 102 and the data storage 203 and 204. This process may be referred to as "failover".

One example of a storage system 110 having an architecture similar to that illustrated in FIG. 1 is the DS8000™ Enterprise Storage Server of International Business Machines Corp. (IBM®). The DS8000™ is a high performance, high capacity storage control providing data storage that is designed to support continuous operations and implement virtualization of data storage, and is presented herein only by way of embodiment examples and is not intended to be limiting. Thus, the memory data storage system discussed herein is not limited to the DS8000™, but may be implemented in any comparable storage control 200 having memory data invalidation, regardless of the manufacturer, product name, or components or component names associated with the system 110.

In the example of FIG. 1, each server 206 may comprise one or more computer processors 212 and memory 214. The computer processors 212 may comprise internal processing and storage capabilities to store software modules that run on the processors and, inter alia, are used to access data in the data storage 203 and 204.

In one embodiment, the memory 214 may comprise a cache 218. Whenever a host 102 accesses data from the storage system 110, for example in a read operation, the server 206 that performs the operation, for example reading data from storage 203 and 204, may save the data in its cache 218 in the event the data may be required again. If the data is accessed again by a host 102, the server 206 may fetch the data from the cache 218 instead of fetching it from storage 203 and 204, saving both time and resources. Similarly, when a host system 102 performs a write, the server 206 may store, or host system 102 may direct that the data be stored, in cache 218 to be destaged to the storage 203 and 204 at a later time. When a write is stored in cache 218, the write may also be stored in non-volatile storage (NVS) 220 of the opposite server 206 so that the write can be recovered by the opposite server 206 in the event the first server 206 fails.

Figure 2:
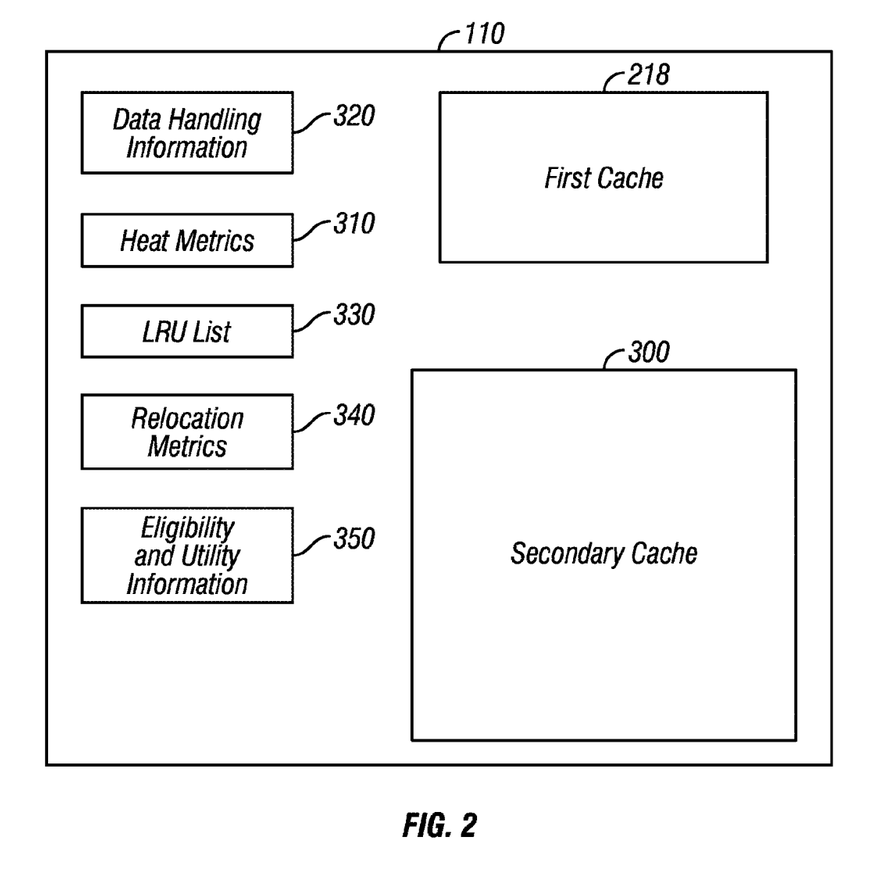
FIG. 2 is a diagrammatic illustration of a computer-implemented data storage memory system of FIG. 1.

Referring to FIGS. 1 and 2, a storage system 110 may comprise both data storage 204, such as hard disk drives, and data storage 203, such as solid state drives (SSDs) based on flash memory. The input/output (I/O) performance of SSD drives or other types of solid state memory is typically far faster than the I/O performance of hard disk drives. Because of the higher I/O performance, the SSDs 203 may, in certain embodiments, be used to provide a large secondary cache 300 between the cache 218, serving as a first cache, and the hard disk drives 204. The use of a large secondary cache 300 may significantly improve the I/O performance of the storage system 110.

Using the secondary cache 300 if a read request is received by a server 206, the server may initially look for data in the first cache 218 and, if the data is not present, look for the data in the secondary cache 300 residing in the SSDs 203. If the data is not available in either cache, the server 206 may retrieve the data from the hard disk drives 204. Similarly, when writing or modifying data, a server 206 may initially write the data or modified data to the first cache 218. The data may eventually be destaged to the secondary cache 300 to make room in the first cache 218. This data may ultimately be destaged to the disk drives 204 to make space available in the secondary cache 300.

As an example, the secondary cache 300 may be sized to provide about one to twenty percent of the total data storage capacity of the storage system 110. Thus, for a storage system 110 that comprises about 40 terabytes of data storage (from both hard disk drives 204 and SSDs 203), about 2 terabytes of this storage space may be used as a secondary cache 300. The first cache 218 is typically a small percentage of the size of the secondary cache 300. As an exemplary embodiment, the storage space for both the first cache 218 and the secondary cache 300 may be arranged in pages to provide ease of handling.

Figure 3:
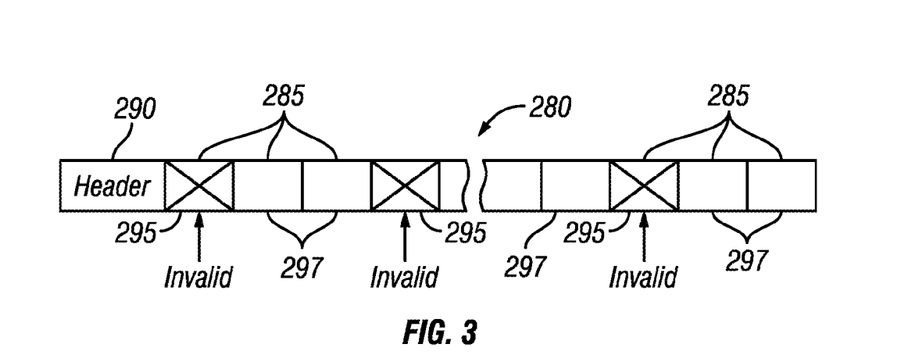
FIG. 3 is a diagrammatic illustration of an extent of data stored by the data storage memory system of FIG. 2.
Figure 4:
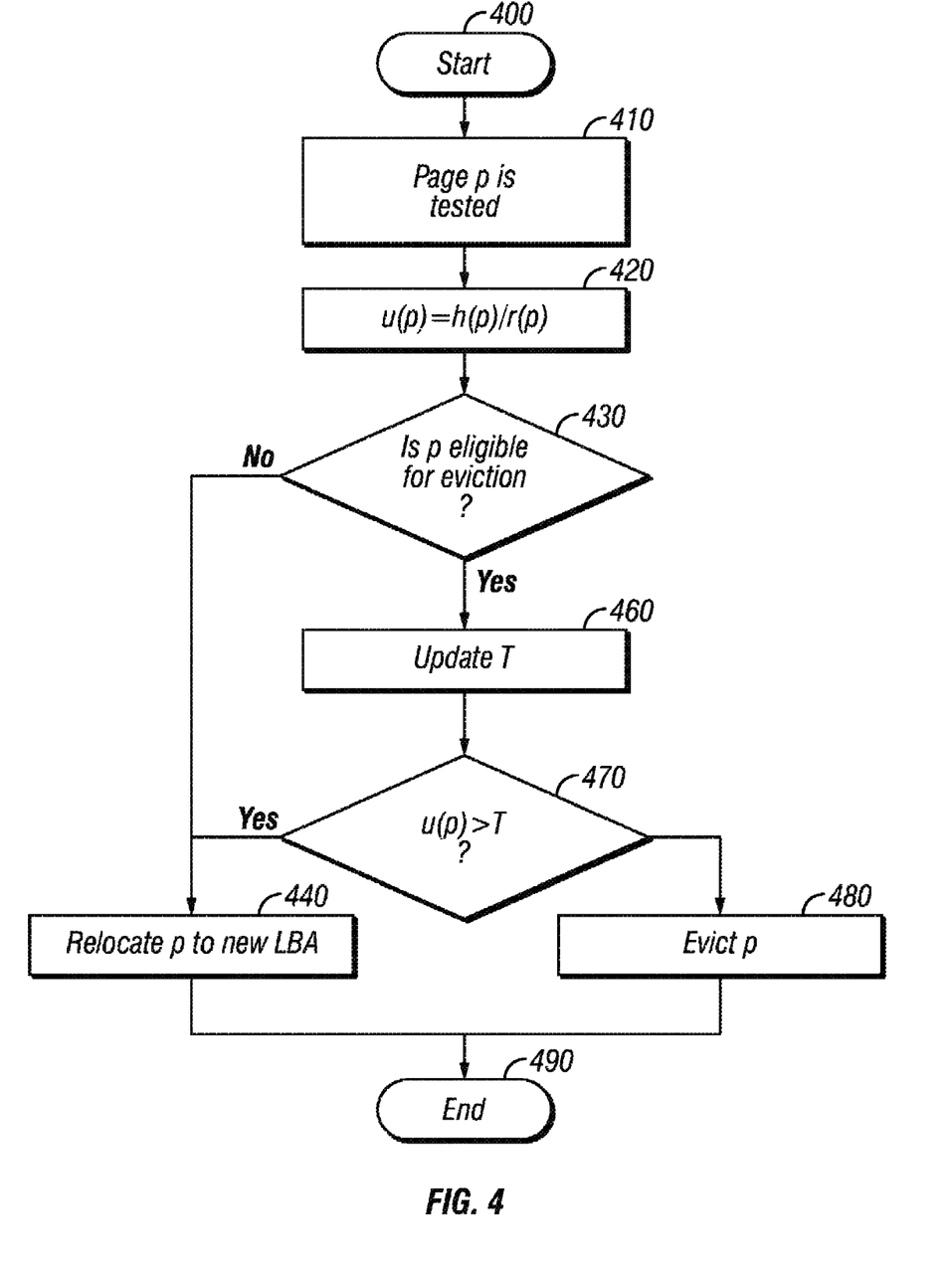
FIG. 4 is a flow chart depicting an exemplary method of operating the system of FIGS. 1 and 2.

Referring to FIGS. 2, 3 and 4, in one embodiment, space must be reclaimed in the first cache 218 and also in the secondary cache 300 to accommodate new data. Similarly, all memories, once full, must provide a means for reclaiming space in order to accommodate new data. As discussed above, in some memories, such as a secondary cache memory, the data is stored in log-structured fashion in large extents 280 of data as pages 285. The control 200 of FIG. 1 tracks the data pages, for example, with metadata, at the data handling information 320. A property of the log-structured extents (LSE) is that all writes are sequential writes, an advantage when the memory 300 comprises SSDs. Another advantage is that multiple pages may be written to the memory using a single I/O (input/output) operation. Still another advantage is that the internal bookkeeping for an LSE can be accomplished using a small header 290 at the beginning of the LSE 280. Alternatively, the small header 290 may also be placed elsewhere in the extent, such as at the end of the extent. A disadvantage is discussed above and is that the valid pages may be relocated, and may be relocated many times, as the LSEs are combined and rearranged to reclaim space in the form of empty LSEs.

In one embodiment, the data pages are reviewed under a LRU algorithm to provide an LRU list 330, which can be considered as nominating pages to be invalidated. As above, if a page is retained and not invalidated, but is in an LSE that comprises a large number of invalidated pages, the page is relocated to another LSE so that the present LSE may be reclaimed. The locations of pages or groups of pages in the data handling information 320 and the mappings therein are updated accordingly when pages are relocated. A relocation metric, such as a count of the number of relocations, is tracked by page in relocation metrics 340.

In one embodiment, the control 200 of FIG. 1 also tracks heat metrics 310 of the data in the memory, such as secondary cache 300.

One example of a heat metric is a count of the number of times that the page of data has been accessed ("hit") since it was last stored within the data storage system. For example, data may be located in data storage 204 and be read by a host system and stored additionally in the secondary cache memory 300. Further, newly written data may be stored in cache memory 300, pending movement into data storage 204. The number of hits can be implemented in the form of a counter in the metadata entry for each page 320, for example.

Other examples of heat metrics comprise a number of hits of a page over a limited period of time or a predetermined number of requests processed. The heat metrics may alternatively comprise a ratio of hits to a page compared to an average of hits to all pages.

Still further, the heat metrics may be aged, giving less weight to hits that are not recent. The aging may be linear or exponential.

As discussed above, while some pages, such as pages 295 of LSE 280, are invalidated, the valid pages 297 may be relocated, and may be relocated many times, as the LSEs are combined and rearranged to reclaim space in the form of empty LSEs. In one embodiment, the control 200 of FIG. 1 also tracks the location of the data with the data handling information 320 and updates the location information when the data is relocated within the data storage memory, such as secondary cache memory 300. The control 200 tracks the relocation metrics 340 for each page.

In one embodiment, the relocation metrics 340 comprise a count of the number of times that a page has been relocated during reclamation process iterations. To avoid the possibility of the ratio having an answer of infinity, the denominator relocation metric $r(p)$ may be given an initial value of "1".

The relocation metrics 340 and the heat metrics 310 may both be determined by counters for each page associated with the metadata 320.

In one embodiment, the amount of data that is invalidated is increased by selectively relocating only pages that meet a heat utility threshold. The rest of the pages will be invalidated and removed from the cache. That is, many cold pages will be treated as invalid pages during the reclamation process. Thus, a large number of relocation writes will be avoided, effectively resulting in higher memory performance.

Still referring to FIGS. 2, 3 and 4, the control 200 of FIG. 1 determines the heat metrics $h(p)$ for pages of data stored in the data storage memory 300; and determines the relocation metrics $r(p)$ related to relocation of the data within the data storage memory. Then, the utility metrics $u(p)$ of the data are determined relating the heat metrics to the relocation metrics for the data. Data whose utility metric fails a utility metric threshold T, is invalidated, making its space available for space reclamation. In one embodiment, the utility metric comprises a ratio of the heat metric to the relocation metric, in formula terms: $u(p)=h(p)/r(p)$.

Thus, data that otherwise may be saved, but that fails the utility metric threshold T, is instead invalidated, and does not have to be relocated in the data storage memory 300.

In step 400, a page 285 "p" is nominated for eviction, perhaps by an LRU algorithm 330.

In step 410, the page is tested, for example, by fetching the heat metric 310 and the relocation metric 340 for the page. The utility metric for the page, for example the ratio of the heat metric to the relocation metric, $u(p)=h(p)/r(p)$, is determined in step 420.

In the instance where a page has been recently added to the data storage memory 300 and happens to be relocated, the heat metric may be cold since there has been little opportunity for hits and the relocation gives an artificially low utility metric. Thus, in step 430, the timing of the addition to storage is checked, and, if the page has recently been added to the storage, it is exempted from space reclamation eligibility, and, in step 440, is made available for relocation, saving it in the memory 300. Thus, the system allows the page to remain in the memory for some time to give it a chance for getting hits.

Step 430 may be arranged to apply other space management policy 350 to exempt a page from space reclamation eligibility. Some examples comprise making data that has been hit only once is eligible for reclamation, but data that has been hit more than twice is ineligible for a period of time after the last hit; or data that arrived in the memory by sequential reads is eligible for reclamation, but data that arrived due to random reads is ineligible for reclamation.

If step 430 determines that a page is eligible for eviction, it becomes a tentative space reclamation victim page.

Step 460 provides the utility threshold T. Threshold T may be a fixed value, or may be set dynamically.

In one embodiment, the utility metric threshold T is determined from an average of utility metrics for data of the data storage memory 300.

In another embodiment, the average of utility metrics for data of the data storage memory is determined over a period of time.

In still another embodiment, the utility metric threshold T is dynamically determined from an average of utility metrics for data of the data storage identified in an LRU list 330 for the data storage memory 300.

Step 470 compares the utility metric for the page p that is the tentative space reclamation victim u(p) to the threshold T. The intent is to save and relocate only those pages that have high utility, and to invalidate pages that fail the utility metric threshold T, so that they do not have to be relocated in the data storage memory.

Thus, if step 470 determines that the utility metric for page p fails a utility metric threshold T, step 480 makes the page available for space reclamation. If step 470 determines that the utility metric for page p meets or exceeds the utility metric threshold T, step 440 makes the page available for relocation, exempting the page from space reclamation and saving it in the memory 300.

Step 490 either moves to the next page, or advances to conduct the relocations and rearrangement of the LSEs. The relocation of the pages comprises determining the invalidated pages of the data eligible for reclamation; and selecting at least one log structured extent having the greatest number of invalidated pages, for relocating valid pages therein into another log structured extent, to reclaim the selected log structured extent.

Should the memory 300 be managed in a log-structured manner without using LSEs, the space is reclaimed over the entire memory, and the relocation algorithm, relocation metrics, utility metrics, and threshold are arranged to the specifics of the memory arrangement.

A person of ordinary skill in the art will appreciate that the embodiments of the present invention, disclosed herein, including the computer-implemented storage control 200 for reclaiming space of a data storage memory 300 of the storage system 110 of FIG. 1, and the functionality provided therein, may be embodied as a system, method or computer program product. Accordingly, embodiments of the present invention may take the form of an entirely hardware embodiment, an entirely software embodiment (including firmware, resident software, micro-code, etc.) or a combination thereof, such as an embodiment combining software and hardware aspects that may all generally be referred to herein as a "circuit," "module" or "system." Furthermore, embodiments of the present invention may take the form of a computer program product embodied in one or more non-transient computer readable medium(s) having computer readable program code embodied thereon.

Any combination of one or more non-transient computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for reclaiming space of a data storage memory of a data storage memory system, comprising:
   determining heat metrics of data stored in said data storage memory;
   determining relocation metrics related to relocation of said data within said data storage memory, said relocation metrics comprising a count of the number of times said data has been relocated during reclamation process iterations;
   determining utility metrics of said data relating said heat metrics to said relocation metrics for said data; and
   performing at least one action selected from the group consisting of:
   (i) making said data whose utility metric fails a utility metric threshold, available for space reclamation and
   (ii) making said data whose utility metric meets or exceeds said utility metric threshold exempted from space reclamation.

2. The method of claim 1, additionally comprising:
   exempting from space reclamation eligibility, data recently added to said data storage memory.

3. The method of claim 1, additionally comprising:
   exempting from space reclamation eligibility, data designated as ineligible by space management policy.

4. The method of claim 1, wherein said utility metric threshold is determined from an average of utility metrics for data of said data storage memory.

5. The method of claim 4, wherein said average of utility metrics for data of said data storage memory is determined over a predetermined number of space reclamation requests processed.

6. The method of claim 1, wherein said utility metric threshold is dynamically determined from an average of utility metrics for data of said data storage identified in an LRU list for said data storage memory.

7. The method of claim 1, wherein said data stored in said data storage memory is in the form of pages, and wherein said utility metric threshold for a tentative space reclamation victim page of said data, is dynamically determined from an average of utility metrics for pages of said data having similar heat metrics to said tentative space reclamation victim.

8. The method of claim 1, wherein said data stored in said data storage memory is in the form of pages in log structured extents; and said method additionally comprises:
   invalidating pages of said data eligible for reclamation;
   selecting at least one log structured extent having the greatest number of invalidated pages, for relocating valid pages therein into another log structured extent, to reclaim said selected log structured extent.

9. The method of claim 8, wherein said heat metric is based upon the number of hits to data whose heat metric is being determined; and said relocation metric is based upon the number of times said data whose relocation metric is being determined is relocated to another log structured extent.

10. A computer-implemented data storage memory system comprising:
    at least one data storage memory; and
    a processor configured to obtain instructions that cause the processor to perform a method for reclaiming space of said data storage memory, said method comprising:
    determining heat metrics of data stored in said data storage memory;
    determining relocation metrics related to relocation of said data within said data storage memory, said relocation metrics comprising a count of the number of times said data has been relocated during reclamation process iterations;
    determining utility metrics of said data relating said heat metrics to said relocation metrics for said data; and
    performing at least one action selected from the group consisting of:
    (i) making said data whose utility metric fails a utility metric threshold, available for space reclamation and
    (ii) making said data whose utility metric meets or exceeds said utility metric threshold exempted from space reclamation.

11. The computer-implemented data storage memory system of claim 10, wherein said method further comprises:
    exempting from space reclamation eligibility, data recently added to said data storage memory.

12. The computer-implemented data storage memory system of claim 10, wherein said method further comprises:
    exempting from space reclamation eligibility, data designated as ineligible by space management policy.

13. The computer-implemented data storage memory system of claim 10, wherein said utility metric threshold is determined from an average of utility metrics for data of said data storage memory.

14. The computer-implemented data storage memory system of claim 10, wherein said utility metric threshold is dynamically determined from an average of utility metrics for data of said data storage identified in an LRU list for said data storage memory.

15. The computer-implemented data storage memory system of claim 10, wherein said data stored in said data storage memory is in the form of pages, and wherein said utility metric threshold for a tentative space reclamation victim page of said data, is dynamically determined from an average of utility metrics for pages of said data having similar heat metrics to said tentative space reclamation victim.

16. A computer program product for reclaiming space of a data storage memory of a data storage memory system, said computer program product comprising a non-transitory computer-readable storage medium having program code embodied therein, said program code configured to cause a processor to perform a method comprising:

determining heat metrics of data stored in said data storage memory;

determining relocation metrics related to relocation of said data within said data storage memory, said relocation metrics comprising a count of the number of times said data has been relocated during reclamation process iterations;

determining utility metrics of said data relating said heat metrics to said relocation metrics for said data; and performing at least one action selected from the group consisting of:

(i) making said data whose utility metric fails a utility metric threshold, available for space reclamation and (ii) making said data whose utility metric meets or exceeds said utility metric threshold exempted from space reclamation.

17. The computer program product of claim 16, wherein said method further comprises:

exempting from space reclamation eligibility, data recently added to said data storage memory.

* * * * *